Patented Nov. 17, 1931

1,832,242

UNITED STATES PATENT OFFICE

FELIX RISSE, OF HOCHST-ON-THE-MAIN, HANS EMIL WOHLERS, OF WIESBADEN, AND MAX PAQUIN, OF KOENIGSTEIN-ON-THE-TAUNUS, GERMANY, ASSIGNORS TO GENERAL ANILINE WORKS, INC., OF NEW YORK, N. Y., A CORPORATION

PIGMENT DYES AND PROCESS OF MAKING SAME

No Drawing. Application filed September 25, 1925, Serial No. 58,653, and in Germany October 1, 1924.

It is known that pigment dyes or pigments can be obtained in a state of extremely fine division in an aqueous suspension by means of a number of agents. If the finely divided pigment dyes in such an aqueous suspension are brought to dryness they lose their state of being finely divided for the most part. The pigment dyes once dessicated, even if they are very finely ground, cannot again be brought into approximately the same finely divided state in which they were when in the aqueous suspension.

Now we have found that by intimately mixing organic and inorganic pigments or pigment dyes with resins and higher (solid) fatty acids, or with a mixture of these bodies the fine division which the pigment dye shows when it is in the aqueous suspension, can be preserved and restored even after the product has been dried to a powder.

According to our new process the finely divided pigment dyes when in an aqueous suspension are enveloped with a layer of a substance which preserves during the drying thereof their fine division and which is soluble in organic liquids. Thus the pigments when resuspended may be obtained in the same finely divided state in which they were in the original aqueous paste.

There is no chemical reaction or combination between the coating or enveloping material and the pigment dye, and the former may be removed by means of organic solvents such as alcohol. The enveloping of the pigment dye may be accomplished by adding a caustic alkali solution of the resin or fatty acid to an aqueous paste of the pigment dye and then treating the mixture with mineral acid to a weak acid reaction. Thus the resin or fatty acid is made to uniformly coat the pigment dye particles. The coated pigment particles precipitated by the mineral acid treatment is filtered, washed free of mineral acid and dried. For practical purposes the products obtained in the above described manner may, for instance, be combined with a dipping varnish obtained from cellulose ester or cellulose ether.

The preparations obtained by the above described processes can be used with great advantage in all cases, where the bodies combined with them have no undesirable action. However, before using the pigment dyes, the admixed preparations may also be again eliminated from them by certain solvents while preserving them in their finely divided state.

The following examples illustrate our invention, the parts being by weight:

(1) A diluted, aqueous paste containing 20 parts by weight of a pigment dye (100% strength) for instance of that obtained by coupling diazotized m-nitro-p-toluidine on acetoacetic acid anilide, is mixed and well stirred with an alkaline solution of 40 parts of colophony, then rendered acid towards congo-paper by hydrochloric acid, filtered off, washed until neutral and dried. There may be used instead of the colophony solution an alkaline solution of shellac, copal and also solutions of an artificial resin which is soluble in an alkali, for instance the resin obtained in known manner by condensing a phenol or a carboxylic acid with an aldehyde; furthermore there may be used soaps derived from fatty acids.

(2) 63 parts of a paste, containing 20 parts of manganese peroxide which has been produced in a wet way and not dried, are well stirred with a diluted alkaline solution of 40 parts of colophony and then mixed with a quantity of hydrochloric acid corresponding to that of the alkali; the mixture is then filtered and repeatedly washed and dried. The same operations may be carried out with other inorganic pigments such as carbon, mineral colors, finely divided metals or the like.

(3) 144 parts of $\beta$-naphthol are dissolved, as usual, with caustic soda solution, to this solution are added 293 parts of colophony, likewise dissolved in an alkali. The whole is then precipitated by means of acetic acid, mixed with the required quantity of sodium acetate and then coupled with a diazo solution prepared in the usual manner from 138 parts of p-nitraniline.

(4) A vat prepared in the usual manner from 20 parts of indigo is mixed with an alkaline solution of 40 parts of colophony. The dyestuff is blown out with air, then precipitated in presence of sodium sulfite with the quantity of mineral acid equivalent to that of the alkali, filtered off and dried.

(5) A vat prepared in the usual manner from 20 parts of indigo is mixed with an alkaline solution of 40 parts of colophony. From this mixture the pigment dye is immediately precipitated as above indicated, whereupon the leuco compound is filtered off and dried.

(6) 144 parts of β-naphthol are dissolved as usual in a caustic soda solution and there are then added 293 parts of colophony which are also dissolved in an alkali. The resulting product is precipitated with an acid and coupled in presence of sodium carbonate or bicarbonate with 138 parts of diazotized p-nitraniline. In order to obtain the pigment dye in a finely divided state, some Turkey red oil is added thereto. After the copulation is complete, the mass is acidified by a mineral acid, filtered off, washed and dried.

In the following claims the term "organic acids of high molecular weight" is intended to comprise such acids as are at ordinary temperature in a solid state of aggregation, as for instance the above named resin and fatty acids.

We claim:

1. As new products, finely divided dry pigments, the particles of which are covered by a thin layer of an organic acid of high molecular weight.

2. As new products, finely divided dry pigments, the particles of which are covered by a thin layer of a resin acid.

3. As new products, finely divided dry pigments, the particles of which are covered by a thin layer of colophony.

4. The process of preparing finely divided dry pigments which comprises forming an aqueous suspension of pigments in a solution consisting of water and a water-soluble compound of an organic acid of high molecular weight, then precipitating the organic acid by means of a mineral acid, separating the whole from water and drying it.

5. The process of preparing finely divided dry pigments which comprises forming an aqueous suspension of pigments in a solution consisting of water and a water-soluble compound of a resin acid, then precipitating the resin acid by means of a mineral acid, separating the whole from water and drying it.

6. The process of preparing finely divided dry pigments which comprises forming an aqueous suspension of pigments in a solution consisting of water and a water-soluble alkali metal compound of colophony, then precipitating the colophony by means of hydrochloric acid, separating the whole from water and drying it.

In testimony whereof, we affix our signatures.

Dr. FELIX RISSE.
Dr. H. E. WOHLERS.
Dr. MAX PAQUIN.